United States Patent
Nakaganna

(10) Patent No.: US 10,427,263 B2
(45) Date of Patent: Oct. 1, 2019

(54) HAND-HELD CUTTER

(71) Applicant: YAMABIKO CORPORATION, Tokyo (JP)

(72) Inventor: Hiroshi Nakaganna, Hiroshima (JP)

(73) Assignee: YAMABIKO CORPORATION, Tokyo (JP)

(*) Notice: Subject to any disclaimer, the term of this patent is extended or adjusted under 35 U.S.C. 154(b) by 0 days.

(21) Appl. No.: 15/946,721

(22) Filed: Apr. 5, 2018

(65) Prior Publication Data

US 2018/0290253 A1   Oct. 11, 2018

(30) Foreign Application Priority Data

Apr. 6, 2017 (JP) .................. 2017-076192

(51) Int. Cl.
| | |
|---|---|
| *B23Q 11/06* | (2006.01) |
| *B23D 45/16* | (2006.01) |
| *B23Q 11/08* | (2006.01) |
| *B27G 19/04* | (2006.01) |
| *B28D 1/04* | (2006.01) |

(52) U.S. Cl.
CPC .............. *B23Q 11/08* (2013.01); *B23D 45/16* (2013.01); *B23Q 11/06* (2013.01); *B27G 19/04* (2013.01); *B28D 1/04* (2013.01)

(58) Field of Classification Search
CPC ........ B23Q 11/08; B23Q 11/06; B23D 45/16; B28D 1/04; B27G 19/04
USPC .......................................................... 30/390
See application file for complete search history.

(56) References Cited

U.S. PATENT DOCUMENTS

| | | | | |
|---|---|---|---|---|
| 4,060,940 A | * | 12/1977 | DeWitt .................. | B24B 55/05 451/358 |
| 4,343,115 A | * | 8/1982 | Stabler .................. | B23Q 11/08 144/251.1 |
| 4,848,001 A | * | 7/1989 | Clark .................... | B23D 47/12 30/391 |
| 5,140,754 A | | 8/1992 | Martenson | |
| 7,131,897 B2 | * | 11/2006 | Crover ................. | B23D 45/006 451/311 |
| 2018/0290253 A1 | * | 10/2018 | Nakaganna ............ | B23Q 11/06 |

FOREIGN PATENT DOCUMENTS

JP   4575554 B2   11/2010

OTHER PUBLICATIONS

European Search Report dated Aug. 1, 2018 in application No. 18164023.6.

* cited by examiner

*Primary Examiner* — Hwei-Siu C Payer
(74) *Attorney, Agent, or Firm* — Maschoff Brennan

(57) ABSTRACT

The hand-held cutter includes: a cutting blade which is configured to rotate about a rotation shaft to cut a target; a cutter body which rotatably supports the cutting blade; a protection cover which covers a portion of the cutting blade and is rotatable about the rotation shaft; a pressing mechanism which is configured to move toward the protection cover to press a guide plate onto a support plate so as to impose and maintain restrictions on rotation of the protection cover; and a torsion coil spring exerting a biasing force to move the pressing mechanism toward the protection cover. The hand-held cutter is configured such that moving the pressing mechanism, against the biasing force of the torsion coil spring, away from the protection cover removes restrictions on the rotation of the protection cover.

6 Claims, 9 Drawing Sheets

HAND-HELD CUTTER

CROSS-REFERENCE TO RELATED APPLICATION

This application claims priority to Japanese Patent Application No. 2017-076192 filed on Apr. 6, 2017, the entire disclosure of which is incorporated by reference herein.

BACKGROUND

The present disclosure relates to a hand-held cutter configured to cut concrete, asphalt, and other materials.

For example, a known hand-held cutter disclosed in Japanese Patent No. 4575554 includes a cutter body which has an arm member extending substantially horizontally. The arm member rotatably supports, on its tip end, a disc-shaped cutting blade of which the center axis extends horizontally and perpendicularly to the direction in which the arm member extends. The cutter body incorporates an engine for driving and rotating the cutting blade. A half of the cutting blade closer to the engine is covered with a protection cover which has a substantially semicircular shape in front view. The protection cover is rotatable about the center axis of the cutting blade. An arc-shaped guide plate extending around the center axis of the cutting blade is attached to the protection cover at a predetermined distance from the peripheral surface of the protection cover. The guide plate rotates integrally with the protection cover. The guide plate has an arc-shaped slit formed therein. A bolt with a washer passes through the slit such that the shaft of the bolt is situated in the slit. A lock lever is mounted to the head of the bolt, and the shaft of the bolt is partially screwed in a screw hole formed in the cutter body. An operator rotates the protection cover by a desired angle, and then, turns the lock lever. This operation causes the shaft of the bolt to be screwed further into the screw hole, resulting in that the guide plate becomes clamped between the washer and the cutter body. In this manner, the protection cover is fastened to the cutter body.

SUMMARY

However, the operator needs to manually perform a plurality of steps in order to fasten the protection cover to a desired position on the cutter body of the hand-held cutter of the Japanese Patent No. 4575554. Specifically, first, the operator turns the lock lever in one direction to screw the bolt away from the screw hole such that the washer becomes separated from the cutter body and the protection cover is unfastened from the cutter body. Next, the operator rotates the protection cover about the center axis of the cutting blade and positions the protection cover as desired. Thereafter, the operator turns the lock lever in the other direction to screw the bolt into the screw hole. Consequently, the guide plate becomes clamped between the washer and the cutter body, thereby fastening the protection cover. Thus, according to Japanese Patent No. 4575554, the operation for changing the position of the protection cover is complicated.

In view of the foregoing problem, it is therefore an object of the present disclosure to provide a hand-held cutter including a protection cover which is easy to fasten to a desired position.

To achieve the above object, the present disclosure has a configuration in which a protection cover is fastened to a cutter body using a biasing force of a biasing member.

Specifically, a first aspect of the present disclosure is directed to a hand-held cutter including: a disc-shaped cutting blade which is configured to rotate about a rotation shaft to cut a target; a cutter body which rotatably supports the cutting blade; a protection cover which is rotatable about the rotation shaft and covers a portion of the cutting blade; a pressing mechanism which is movable in parallel to the rotation shaft, and when positioned close to one side of the hand-held cutter, imposes and maintains restrictions on rotation of the protection cover by pressing the protection cover onto the cutter body or the cutter body onto the protection cover; and a biasing member which is configured to exert a biasing force to move the pressing mechanism toward the one side of the hand-held cutter. The hand-held cutter is configured such that moving the pressing mechanism, against the biasing force of the biasing member, toward a side opposite to the one side of the hand-held cutter removes the restrictions on the rotation of the protection cover.

According to the first aspect of the present disclosure, to fasten the protection cover at a desired position of the cutter body, the operator first moves the pressing mechanism against the biasing force of the biasing member to remove the restrictions on the rotation of the protection cover. Next, the operator rotates the protection cover to the desired position, and moves his/her hand off the pressing mechanism. The pressing mechanism then automatically moves due to the basing force of the biasing member, thereby imposing the restriction on the rotation of the protection cover. Thus, the operator has to manipulate the pressing mechanism only when he/she removes the restrictions on the rotation of the protection cover. Unlike the Japanese Patent No. 4575554, the operator does not have to manipulate the pressing mechanism both when he/she imposes the restrictions on the rotation of the protection cover and when he/she removes the restrictions. This allows the operator to easily fasten the protection cover at a desired position.

DETAILED DESCRIPTION

Embodiments of the present disclosure will now be described in detail with reference to the drawings. Note that the following description of the embodiments is a merely preferable example in nature, and is not intended to limit the scope, application, or uses of the present disclosure.

First Embodiment of Disclosure

Figure 1:
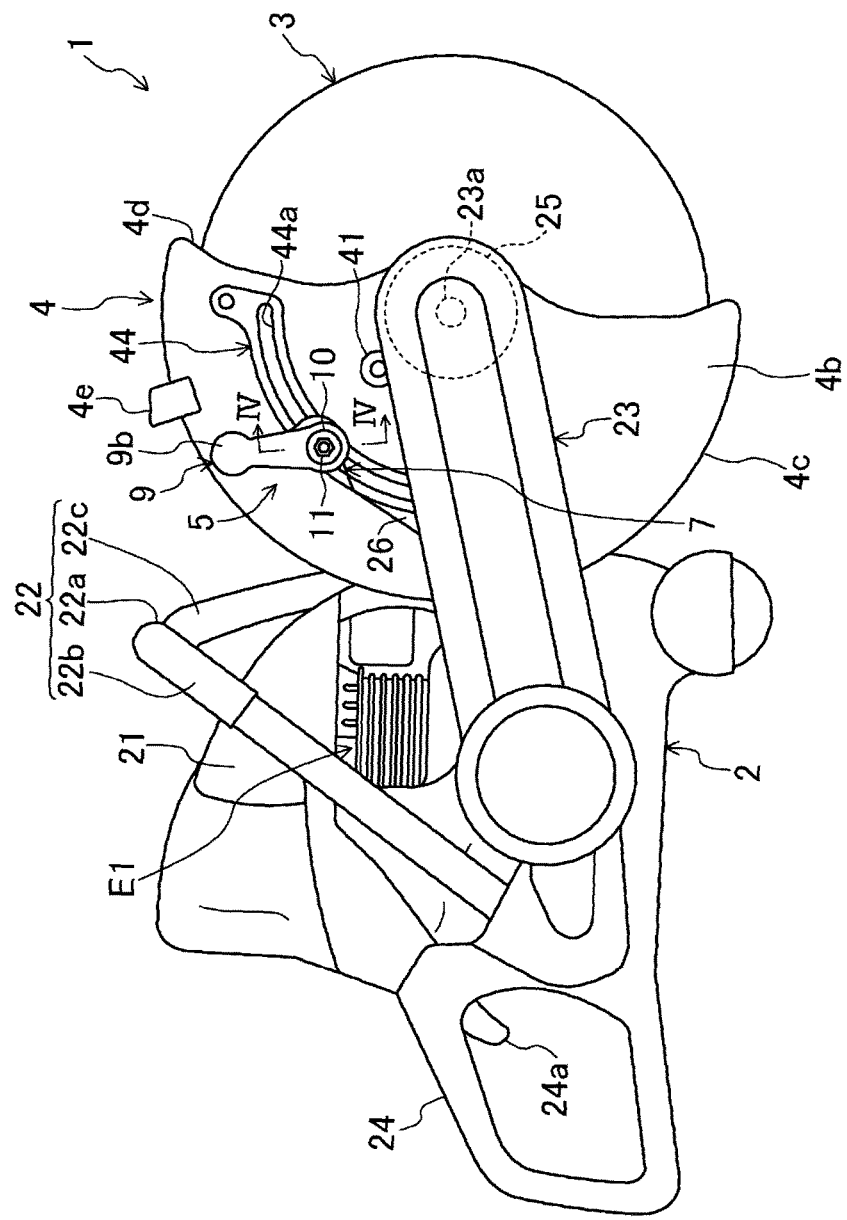
FIG. 1 is a right side view of a hand-held cutter according to a first embodiment of the present disclosure.

FIG. 1 illustrates a hand-held cutter 1 according to a first embodiment of the present disclosure. The hand-held cutter 1 is configured to cut concrete and other materials in a construction site, for example. The hand-held cutter 1 includes: a cutter body 2 incorporating an engine E1; a disc-shaped cutting blade 3 configured to rotate about a rotation shaft 23a to cut a target; and a protection cover 4 protecting the cutting blade 3.

The cutter body 2 includes: an engine cover 21 covering the engine E1; a front handle 22 (a grip frame) extending along an upper portion of the engine cover 21; an arm member 23 extending forward with respect to the engine cover 21 in a substantially horizontal direction; and a rear handle 24 provided rearward of the engine cover 21. A throttle lever 24a for adjusting an rpm of the engine E1 is arranged at the rear handle 24.

The front handle 22 includes: a grip bar 22a extending horizontally and perpendicularly to the arm member 23 and located above a front portion of the engine cover 21; a first support bar 22b extending from one end of the grip bar 22a obliquely downward toward the rear of the cutter 1 and fixed to a lower portion of the cutter body 2; and a second support bar 22c extending from the other end of the grip bar 22a obliquely downward toward the front of the cutter 1 and fixed to a lower portion of the cutter body 2. An operator grips the grip bar 22a to raise the cutter body 2.

The arm member 23 has, at one side surface of an end in the extending direction, the rotation shaft 23a projecting horizontally and perpendicularly to the direction in which the arm member 23 extends.

The cutting blade 3 is detachably attached to the rotation shaft 23a such that the cutting blade 3 rotates integrally with the rotation shaft 23a. Specifically, the cutter body 2 supports the cutting blade 3 such that the cutting blade 3 can rotate about the rotation shaft 23a. When an operator pulls the throttle lever 24a to increase the rpm of the engine E1 from an idling state, the cutting blade 3 rotates via a drive belt (not shown) and the rotation shaft 23a.

Figure 2:
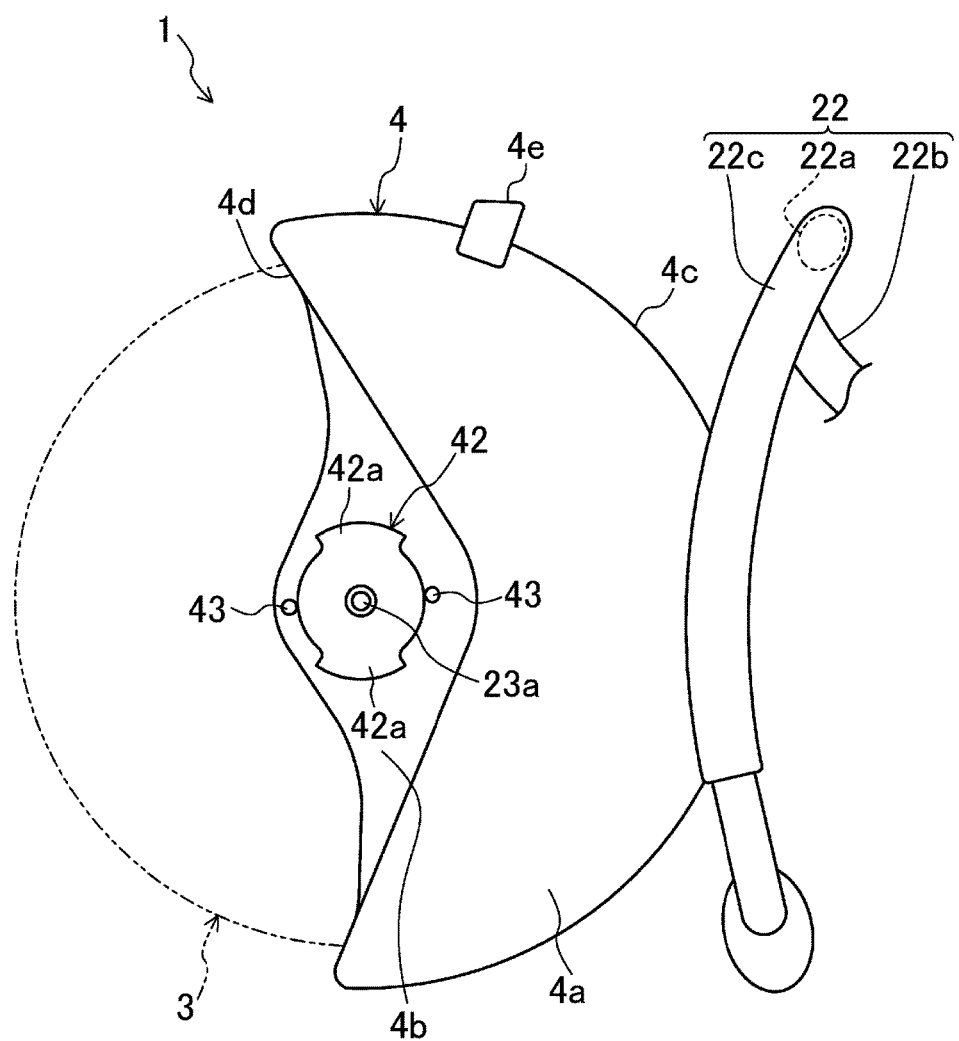
FIG. 2 is a left side view of the hand-held cutter according to the first embodiment of the present disclosure, and illustrates, on an enlarged scale, a protection cover and its surrounding area.

As illustrated in FIGS. 1 and 2, a boss 25 surrounds the rotation shaft 23a of the arm member 23 and protrudes toward the cutting blade 3. The protection cover 4 is attached to a surface of the boss 25 facing the protruding direction such that the protection cover 4 can rotate about the rotation shaft 23a.

Figure 3:
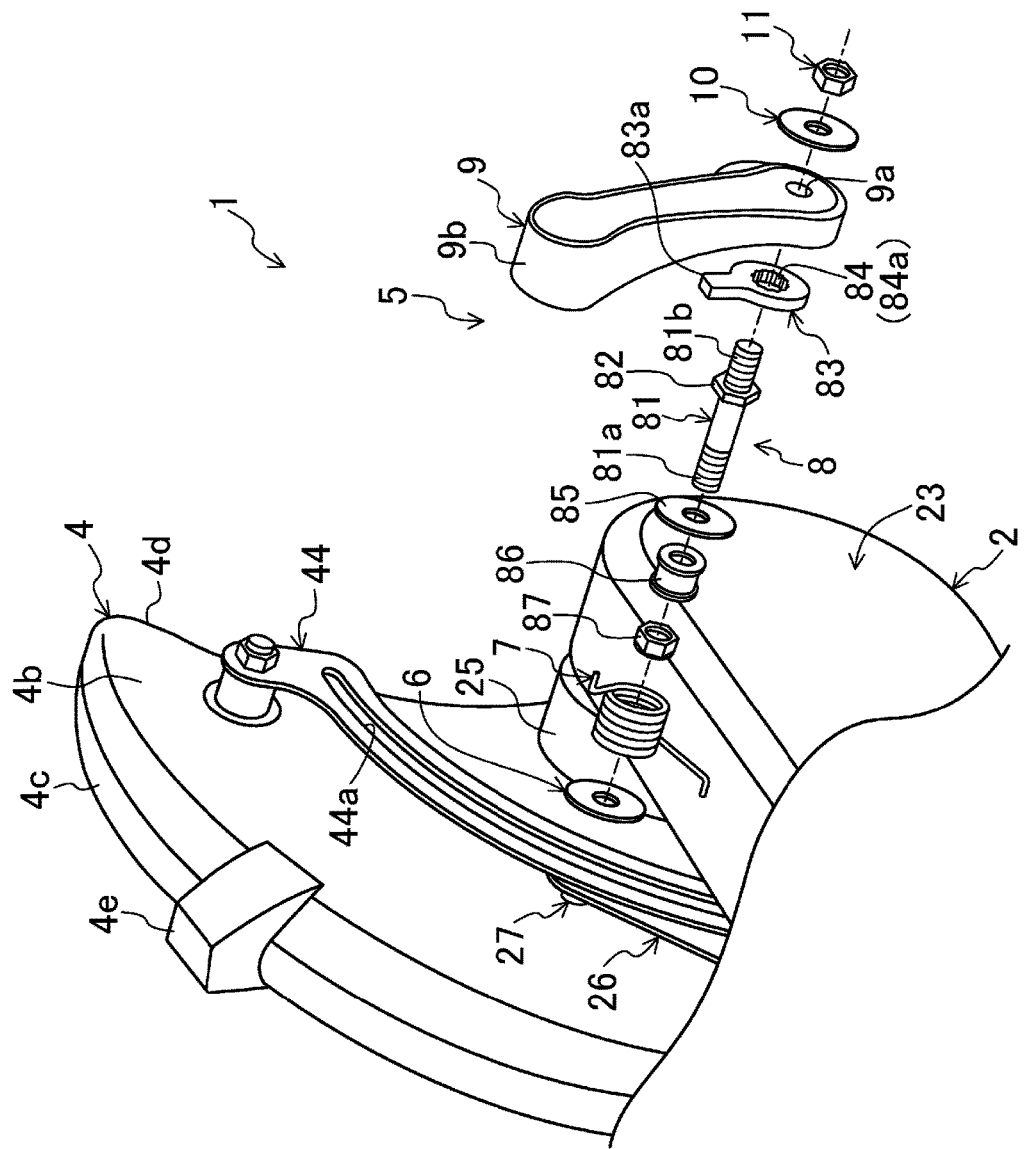
FIG. 3 is an exploded perspective view of a pressing mechanism and components provided near the pressing mechanism of the hand-held cutter according to the first embodiment of the present disclosure.
Figure 4:
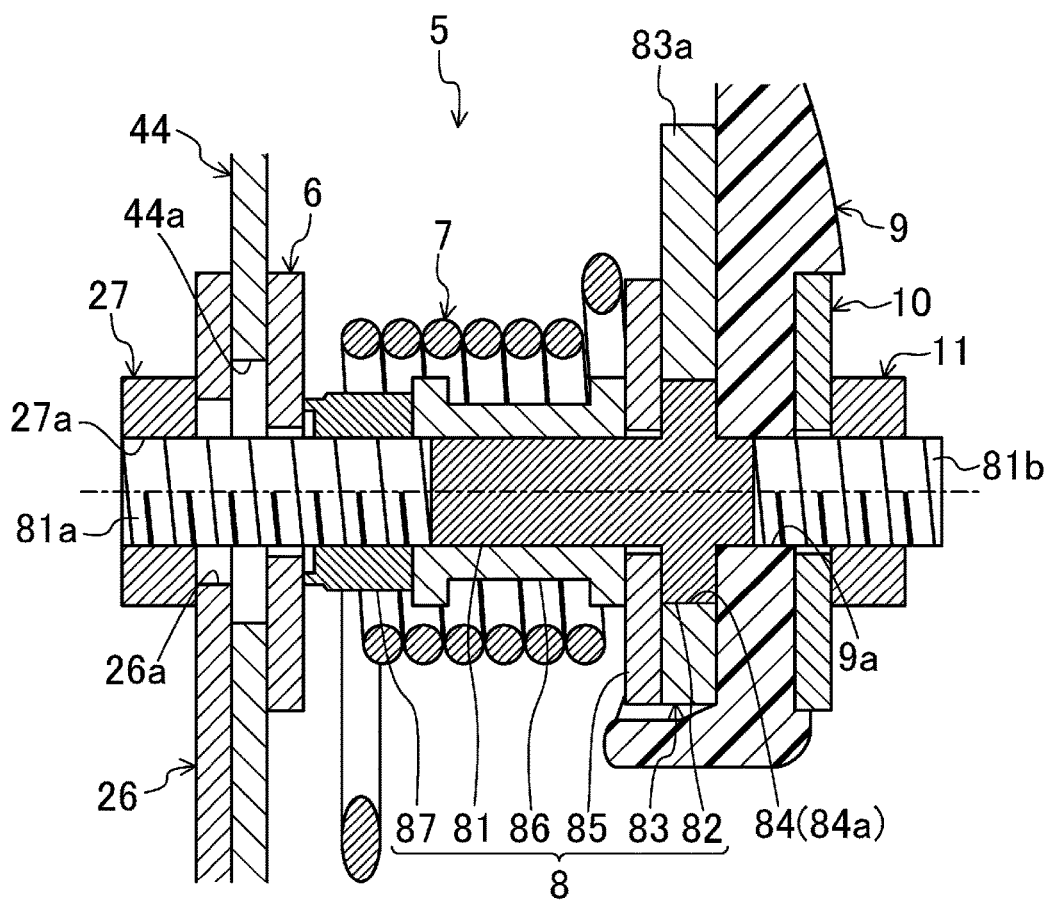
FIG. 4 is a cross-sectional view taken along line IV-IV in FIG. 1.

As illustrated in FIGS. 3 and 4, a support plate 26 which projects upward is provided on the surface of an intermediate portion of the arm member 23 facing the protection cover 4. A through hole 26a penetrates a projecting end portion of the support plate 26 in parallel to the rotation shaft 23a for the cutting blade 3.

On the surface of the support plate 26 facing the protection cover 4, a first nut 27 having a screw hole 27a (a screw receiving portion) is mounted to correspond to the through hole 26a.

As illustrated in FIG. 2, the protection cover 4 includes: a first sidewall 4a having a substantial V-shape in side view; a second sidewall 4b having a substantially semicircular shape in side view and arranged side-by-side with a surface of the first sidewall 4a, the surface facing the arm member 23; and a third sidewall 4c having a curved shape and connecting an edge of the first sidewall 4a closer to the engine E1 to an edge of the second sidewall 4b closer to the engine E1.

The first, second, and third sidewalls 4a, 4b, and 4c together define a housing recess 4d opening toward the front of the cutter 1. The housing recess 4d is configured to house a substantial half of the cutting blade 3 closer to the engine E1.

In other words, the protection cover 4 is configured to cover the substantial half of the cutting blade 3 closer to the engine E1.

A resin member 4e having a substantial block shape and designed to be gripped by an operator is attached to an upper portion of the third sidewall 4c.

A stopper member 41 projecting toward the arm member 23 is provided on the second sidewall 4b. When the operator grips the resin member 4e and rotates the protection cover 4 toward the rear of the cutter 1, the stopper member 41 comes into contact with the arm member 23, thereby preventing the protection cover 4 from being rotated further.

As illustrated in FIG. 2, a stopper plate 42 is disposed at the inner surface of the second sidewall 4b. The stopper plate 42 is fixed to the surface of the boss 25 facing the protruding direction via a through hole (not shown) formed in the second sidewall 4b.

For example, upper and lower edges of the stopper plate 42 are formed as a pair of arc-shaped protuberances 42a which protrude away from each other and have an arc shape extending around the rotation shaft 23a.

A pair of pins 43 projecting away from the arm member 23 are provided on the inner surface of the second sidewall 4b. The pins 43 are spaced apart from each other in the front-rear direction of the cutter 1, while sandwiching the rotation shaft 23a therebetween.

Figure 8:
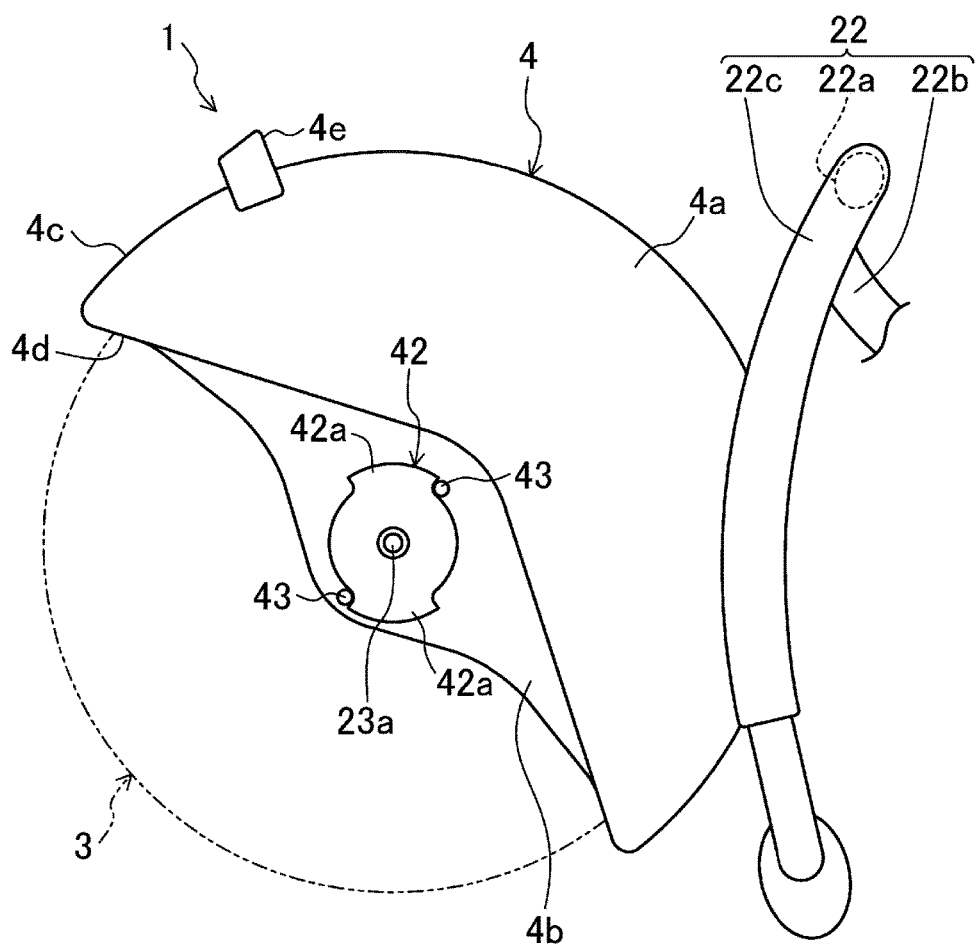
FIG. 8 corresponds to FIG. 2, and illustrates a state where the protection cover has been rotated.

As illustrated in FIG. 8, when the operator grips the resin member 4e and rotates the protection cover 4 toward the front of the cutter 1, the pins 43 respectively come into contact with the arc-shaped protuberances 42a of the stopper plate 42, thereby preventing the protection cover 4 from being rotated further.

As illustrated in FIGS. 1 and 2, an arc-shaped guide plate 44 extending around the rotation shaft 23a is attached on the outer surface of the second sidewall 4b, at a predetermined distance from the outer periphery of the second sidewall 4b. The guide plate has an arc-shaped slit 44a formed therein and extending along the guide plate 44.

The support plate 26 supports a pressing mechanism 5, as illustrated in FIGS. 3 and 4.

The pressing mechanism 5 includes a first washer 6, a torsion coil spring 7 (a biasing member), a rod member 8, a manipulation handle 9, a second washer 10, and a second nut 11.

The rod member 8 includes a shaft 81. The shaft 81 has a first screwable portion 81a on the outer peripheral surface of one end portion of the shaft 81, and a second screwable portion 81b on the outer peripheral surface of the other end portion.

A brim 82 (a fitting portion) is formed integrally with an intermediate portion of the shaft 81 to be adjacent to the second screwable portion 81b. The brim 82 is continuous in the circumferential direction, protrudes radially outwardly, and has the shape of a regular hexagon as viewed along the rotation shaft 23a for the cutting blade 3.

Figure 5:
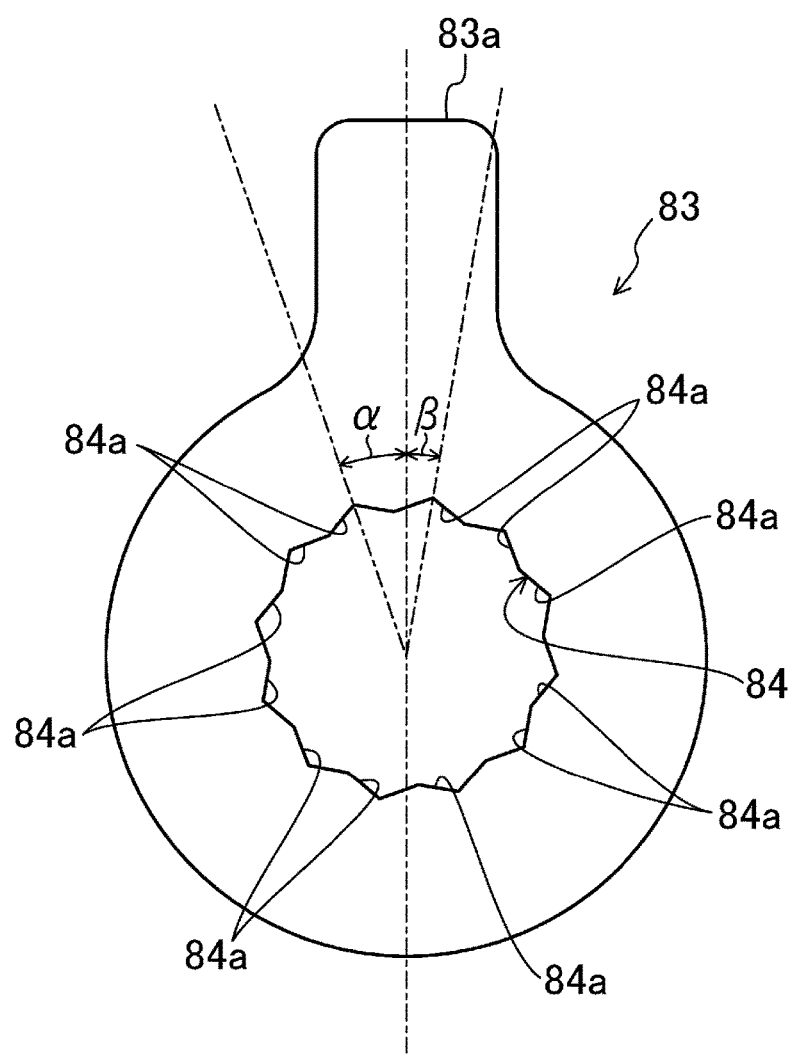
FIG. 5 is a front view of a mounting plate forming part of the hand-held cutter according to the first embodiment of the present disclosure.

As illustrated in FIGS. 3 to 5, the rod member 8 has a mounting plate 83 having a plate shape. The mounting plate 83 has an engagement projection 83a which extends from the outer periphery of the mounting plate 83 and is engageable in the manipulation handle 9.

The mounting plate 83 has a fitting hole 84 penetrating a central portion of the mounting plate 83 as viewed along the rotation shaft 23*a* for the cutting blade 3.

As illustrated in FIG. 5, the wall defining the fitting hole 84 has a plurality of fitting recesses 84*a* arranged regularly in the circumferential direction. The fitting recesses 84*a* each have a triangular shape as viewed in the direction in which the fitting hole 84 penetrates the mounting plate 83, and are engageable with corners of the brim 82.

It is preferable to form twelve fitting recesses 84*a*, for example. The number of the fitting recesses 84*a* is twice as many as the number of sides of the brim 82 having the shape of a regular hexagon as viewed along the rotation shaft 23*a* for the cutting blade 3.

The fitting recesses 84*a* are arranged asymmetrically with respect to a line connecting the center of the engagement projection 83*a* and the center of the fitting hole 84, as viewed in the direction in which the fitting hole 84 penetrates the mounting plate 83. Specifically, an angle $\alpha$ between the line connecting the center of the engagement projection 83*a* and the center of the fitting hole 84 and one of the fitting recesses 84*a* that is directly adjacent to the line in one of the clockwise and counterclockwise directions differs from an angle $\beta$ between the line and another one of the fitting recesses 84*a* that is directly adjacent to the line in the other direction.

If the number of the fitting recesses 84*a* is set to be 12, the angle $\alpha$ and the angle $\beta$ are preferably set to 20° and 10°, respectively. The angle $\beta$ is calculated according to the expression: $\beta = 360°\div(\text{the number of the sides of the brim } 82 \times 2) \pm 3$. The angle $\alpha$ is twice as large as the angle $\beta$.

The mounting plate 83 is mounted to the shaft 81 with the fitting hole 84 externally fitted on the brim 82. The mounting plate 83 can be mounted to the shaft 81, with either of its two faces facing the cutter body 2.

The rod member 8 is obtained in the following manner. A third washer 85 and a short tubular spacer 86 are externally fitted from the one end of the shaft 81 in this order. A third nut 87 is screwed on the first screwable portion 81*a* such that the third washer 85 and the spacer 86 are sandwiched between the third nut 87 and the brim 82. The fitting hole 84 of the mounting plate 83 is then externally fitted on the brim 82. The portion of the rod member 8 except the mounting plate 83 is formed by assembling the shaft 81, the third washer 85, the spacer 86, and the third nut 87 together. Alternatively, this portion of the rod member 8 may be formed as one piece.

The manipulation handle 9 extends in a direction perpendicular to the rotation shaft 23*a* for the cutting blade 3, and is in the shape of a lever. The manipulation handle 9 has one end with a through hole 9*a* bored therein, and the other end configured as a manipulation portion 9*b*.

The one end of the manipulation handle 9 is fixed to the rod member 8 in the following manner. The second screwable portion 81*b* of the shaft 81, which has the mounting plate 83 externally fitted on the brim 82 of the shaft 81, is passed through the through hole 9*a* of the manipulation handle 9 so that the manipulation handle 9 is externally fitted on the mounting plate 83. Consequently, the engagement projection 83*a* of the mounting plate 83 is engaged in the manipulation handle 9. At the same time, the second washer 10 is fitted on the second screwable portion 81*b* and the second nut 11 is screwed on the second screwable portion 81*b*, so that the second washer 10 and the third washer 85 sandwich therebetween the manipulation handle 9 and the mounting plate 83.

The manipulation portion 9*b* of the manipulation handle 9 is positioned above the rod portion 8 in a state where the one end portion of the manipulation handle 9 is fixed to the rod member 8.

The torsion coil spring 7 and the first washer 6 are sequentially mounted to the rod member 8, from the one end of the rod member 8. The rod member 8 is inserted, with its one end directed forward in the insertion direction, into the slit 44*a* of the guide plate 44 and the through hole 26*a* of the support plate 26 in this order. The first screwable portion 81*a* is screwed into the screw hole 27*a* of the first nut 27. In this manner the pressing mechanism 5 is mounted to the support plate 26. Thus, the pressing mechanism 5 is configured to move in parallel to the rotation shaft 23*a* for the cutting blade 3 as the first screwable portion 81*a* of the rod member 8 is screwed into or away from the screw hole 27*a* of the first nut 27.

The rod member 8 is configured to move relative to the slit 44*a* of the guide plate 44 as the protection cover 4 rotates.

In a state where the torsion coil spring 7 is mounted around the rod member 8, the torsion coil spring 7 has one end fixed to an edge portion of the support plate 26, and the other end fixed to the manipulation handle 9, and exerts biasing force in a torsional direction in which the first screwable portion 81*a* is screwed toward the cutter body 2 to cause the rod member 8 to move toward the protection cover 4 (toward the one side of the hand-held cutter 1).

As illustrated in FIG. 4, when the rod member 8 has been moved toward the protection cover 4, the first washer 6 presses the guide plate 44 onto the support plate 26, thereby imposing and maintaining restrictions on the rotation of the protection cover 4.

Figure 6:
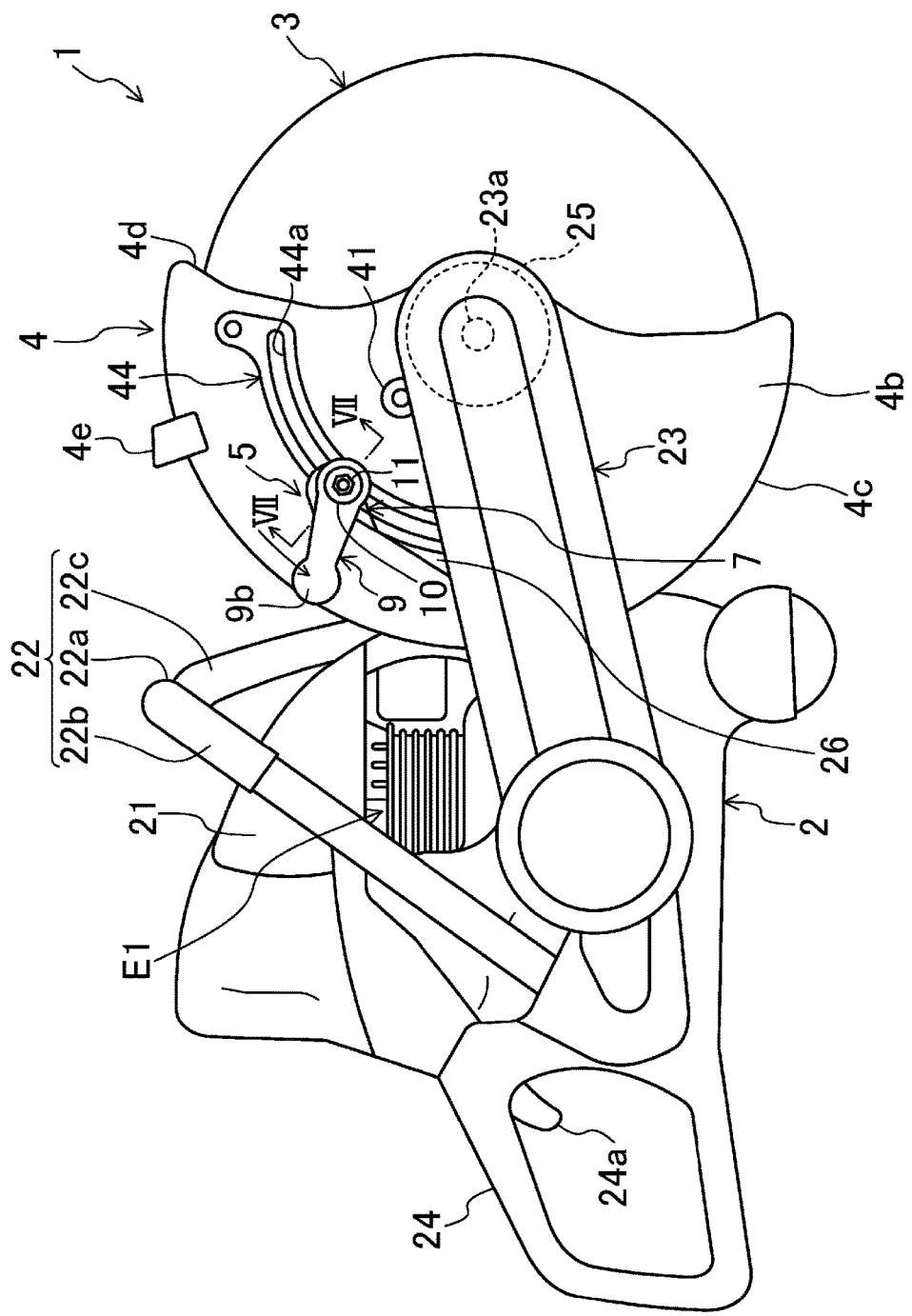
FIG. 6 corresponds to FIG. 1, and illustrates a state where the protection cover is about to be moved.

The manipulation handle 9 is located near the grip bar 22*a* of the front handle 22. As illustrated in FIG. 6, when the operator turns, against the biasing force of the torsion coil spring 7, the manipulation handle 9 to bring the manipulation portion 9*b* closer to the grip bar 22*a*, a force acts in a torsional direction in which the first screwable portion 81*a* is screwed away from the cutter body 2.

Figure 7:
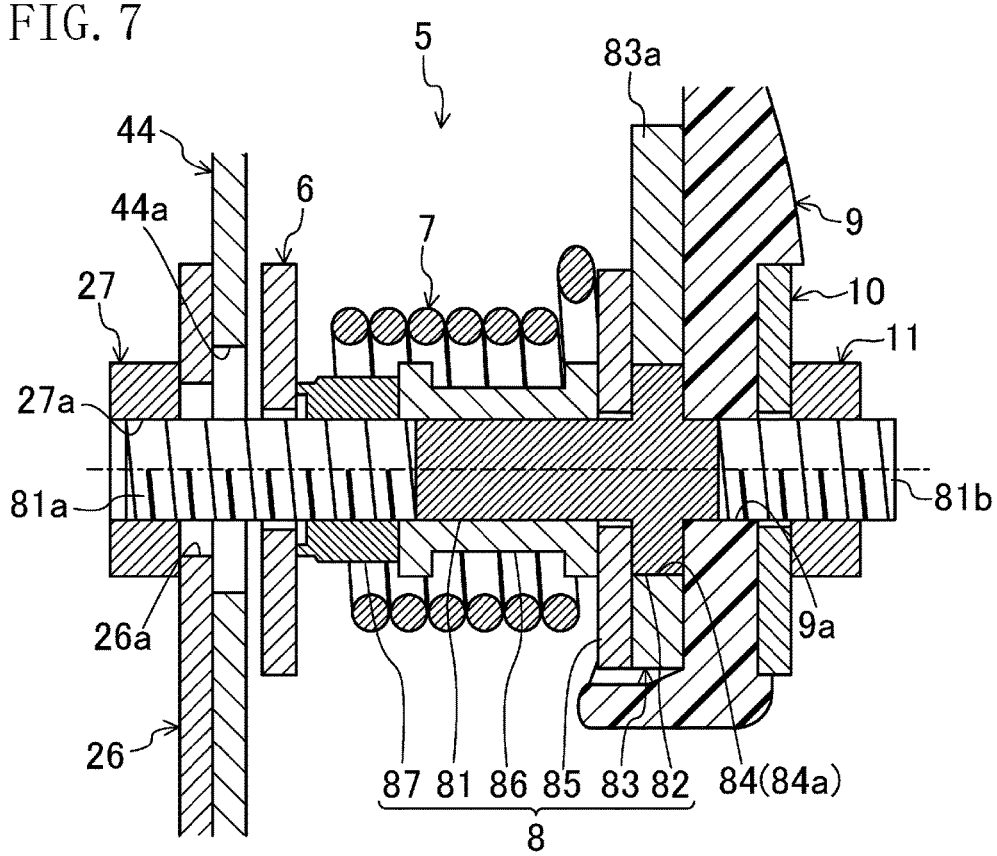
FIG. 7 is a cross-sectional view taken along line VII-VII in FIG. 6.

When the force acts in the torsional direction in which the first screwable portion 81*a* is screwed away from the cutter body 2, the rod member 8 moves away from the protection cover 4, and a gap is produced between the first washer 6 and the guide plate 44, as illustrated in FIG. 7. Thus, the restrictions on the rotation of the protection cover 4 are removed, and the protection cover 4 now can be rotated about the rotation shaft 23*a* for the cutting blade 3.

As can be seen from the foregoing description, according to the first embodiment of the present disclosure, to fasten the protection cover 4 at a desired position of the cutter body 2, the operator first moves the pressing mechanism 5 against the biasing force of the torsion coil spring 7 to remove the restrictions on the rotation of the protection cover 4. Next, the operator rotates the protection cover 4 to the desired position, and moves his/her hand off the pressing mechanism 5. The pressing mechanism 5 automatically moves due to the basing force of the torsion coil spring 7, thereby imposing restrictions on the rotation of the protection cover 4. Thus, the operator has to manipulate the pressing mechanism 5 only when he/she removes the restrictions on the rotation of the protection cover 4. Unlike the case of the Japanese Patent No. 4575554, the operator does not have to manipulate the pressing mechanism 5 both when he/she imposes the restrictions on the rotation of the protection cover 4 and when he/she removes the restrictions. This allows the operator to easily fasten the protection cover 4 at a desired position.

The pressing mechanism 5 is configured to move in parallel to the rotation shaft 23a for the cutting blade 3 by the screwing movements toward and away from the cutter body 2. Therefore, application of a strong force in the direction in which the pressing mechanism 5 moves causes almost no displacement of the pressing mechanism 5. This can substantially prevent unintentional detachment of the pressing mechanism 5 from the cutter body 2 during work.

The torsion coil spring 7 constantly exerts its biasing force in the torsional direction in which the first screwable portion 81a is screwed toward the cutter body 2. As a result, vibration of the cutter 1 in operation causes the first screwable portion 81a of the rod member 8 to be slightly screwed further toward the cutter body 2. This enables the protection cover 4 to be firmly fastened to the cutter body 2 during work performed using the cutter 1.

Since the torsion coil spring 7 is mounted around the rod member 8, the rod member 8 is located inside the torsion coil spring 7. As a result, the rod member 8 is compact.

The rod member 8 is located in the arc-shaped slit 44a extending around the rotation shaft 23a of the cutter 1. When the protection cover 4 is fastened to the cutter body 2, the pressing mechanism 5 presses the protection cover 4 onto the cutter body 2 at a position away from the rotational center of the protection cover 4. As a result, a force (a moment) hindering the rotation of the protection cover 4 can be obtained with a smaller pressing force than in a case where the protection cover 4 is pressed onto a position near the rotational center. This contributes to simplification of the structure and cost reduction.

The manipulation handle 9 is in the shape of a lever. Therefore, an operator can turn the manipulation handle 9, against the biasing force of the torsion coil spring 7, by gripping the manipulation portion 9b with a smaller force than a case where the operator turns the manipulation handle 9 by gripping a portion near the rotational center of the manipulation handle 9. Thus, the manipulation handle 9 is easy to manipulate.

To remove the restrictions on the rotation of the protection cover 4, the operator, holding the grip bar 22a of the front handle 22 in his/her one hand, can bring the manipulation portion 9b closer to the grip bar 22a (i.e., pull the manipulation portion 9b toward the grip bar 22a) using the forefinger and/or the middle finger of his/her hand on the grip bar 22a. Thanks to this configuration, the operator, while holding the grip bar 22a in his/her hand and pressing the cutter body 2 onto the ground or a floor, can rotate the protection cover 4 with the other hand. Thus, the operator can manipulate the manipulation portion 9b with one hand gripping the grip bar 22a, without having to move the other hand in order to manipulate the manipulation portion 9b. This enables the operator to rotate the protection cover 4 with efficiency.

The fitting recesses 84a of the fitting hole 84 are arranged asymmetrically with respect to the line connecting the center of the engagement projection 83a and the center of the fitting hole 84, as viewed in the direction in which the fitting hole 84 penetrates the mounting plate 83. Therefore, if the mounting plate 83 is turned around and the fitting hole 84 is externally fitted on the brim 82 of the shaft 81, the position of the engagement projection 83a with respect to the shaft 81 is slightly changed. Therefore, when the pressing mechanism 5 is assembled, the position of the engagement projection 83a with respect to the shaft 81 may be adjusted minutely such that the torsion coil spring 7 is under a suitable tension. Thus, the fine adjustment needed for the assembly can be achieved easily. In particular, in a situation where the mounting plate 83 has twelve fitting recesses 84a, if the mounting plate 83 is turned around and the fitting hole 84 is externally fitted on the brim 82 of the shaft 81, the position of the engagement projection 83a with respect to the shaft 81 can be adjusted in 10-degree increments in the assembly.

Second Embodiment of Disclosure

Figure 9:
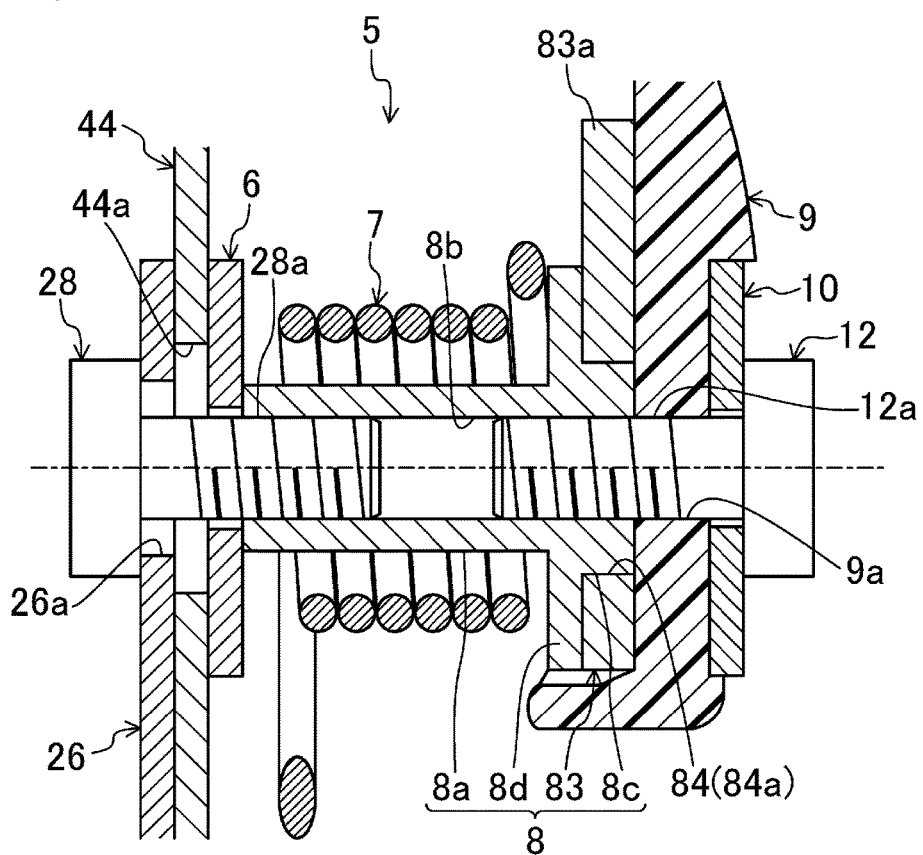
FIG. 9 corresponds to FIG. 4 and illustrates a second embodiment of the present disclosure.

FIG. 9 illustrates a hand-held cutter 1 according to a second embodiment of the present disclosure. The cutter 1 of the second embodiment is the same as that of the first embodiment, except the structure of a portion of a cutter body 2 and the structure of a pressing mechanism 5. In the following description, the same components as those of the first embodiment will be denoted by the corresponding reference characters, and only the differences between the first and second embodiments will be detailed.

The pressing mechanism 5 of the second embodiment includes a first washer 6, a torsion coil spring 7 (a biasing member), a rod member 8, a manipulation handle 9, a second washer 10, and a second bolt 12.

In the second embodiment, a first bolt 28 (a screw receiving portion) is welded to a portion surrounding a through hole 26a of a support plate 26 such that a shaft 28a of the first bolt 28 passes through the through hole 26a to extend away from a protection cover 4 in parallel to a rotation shaft 23a for a cutting blade 3. The first washer 6 is fitted on the shaft 28a.

The rod member 8 of the second embodiment includes a cylindrical portion 8a extending in parallel to the rotation shaft 23a for the cutting blade 3. A screwable portion 8b is formed on the inner peripheral surface of the cylindrical portion 8a, and extends from one end to the other of the cylindrical portion 8a.

The other end of the cylindrical portion 8a is configured as a fitting portion 8c having the shape of a regular hexagon as viewed along the rotation shaft 23a for the cutting blade 3. A fitting hole 84 of a mounting plate 83 can be externally fitted on the fitting portion 8c.

A circular plate portion 8d expanding radially outward is formed integrally with a portion, of the cylindrical portion 8a, which is continuous with the fitting portion 8c.

The one end portion of the manipulation handle 9 is fixed to the rod member 8 in the following manner. The fitting hole 84 of the mounting plate 83 is externally fitted on the fitting portion 8c, and a manipulation handle 9 is then externally fitted on the mounting plate 83 such that an engagement projection 83a of the mounting plate 83 engages in the manipulation handle 9. The shaft 12a of the second bolt 12 is passed through the second washer 10 and a through hole 9a of the manipulation handle 9, and then screwed in the screwable portion 8b of the cylindrical portion 8a, so that the second washer 10 and the circular plate portion 8d sandwich therebetween the manipulation handle 9 and the mounting plate 83. The structure for fixing the manipulation handle 9 to the rod member 8 may have a different configuration.

Further, the torsion coil spring 7 is mounted around the cylindrical portion 8a from the one end. The first bolt 28 having the first washer 6 fitted thereon is screwed in the screwable portion 8b from the one end of the cylindrical portion 8a. Thus, the pressing mechanism 5 is mounted to the support plate 26. The pressing mechanism 5 is configured to move in parallel to the rotation shaft 23*a* for the cutting blade 3 when the screwable portion 8*b* of the rod member 8 is screwed along the shaft 28*a* of the first bolt 28 toward and away from the cutter body 2.

In a state where the torsion coil spring is mounted around the cylindrical portion 8*a*, the torsion coil spring 7 has one end fixed to an edge portion of the support plate 26, and the other end fixed to the manipulation handle 9, and exerts its biasing force in a torsional direction in which the screwable portion 8*b* is screwed further toward the cutter body 2 to cause the rod member 8 to move toward the protection cover 4 (toward the one side of the hand-held cutter 1).

When the rod member 8 has been moved toward the protection cover 4, the first washer 6 presses the guide plate 44 onto the support plate 26, thereby imposing and maintaining restrictions on the rotation of the protection cover 4.

As can be seen from the foregoing, the second embodiment of the present disclosure, in which the first bolt 28 forms part of the screwing movement structure of the pressing mechanism 5, also provides the same advantages as those of the first embodiment.

Note that according to the first and second embodiments of the present disclosure, the pressing mechanism 5 moves toward the protection cover 4 to press the guide plate 44 (the protection cover 4) onto the support plate 26 (the cutter body 2), thereby restricting the rotation of the protection cover 4. However, this is merely a non-limiting example. The hand-held cutter of the present disclosure may be configured such that the pressing mechanism 5 moves toward the protection cover 4 to press the support plate 26 (the cutter body 2) onto the guide plate 44 (the protection cover 4), thereby restricting the rotation of the protection cover 4.

The biasing member of the first and second embodiments of the present disclosure is configured as the torsion coil spring 7. However, this is merely a non-limiting example. The biasing member may be configured as an extension spring, for example.

According to the first and second embodiments of the present disclosure, the pressing mechanism 5 is configured to move in parallel to the rotation shaft 23*a* for the cutting blade 3 by screwing movements. However, this is merely a non-limiting example. The pressing mechanism 5 may be configured to move in parallel to the rotation shaft 23*a* for the cutting blade 3 by sliding movements. According to the first and second embodiments of the present disclosure, the brim 82 and the fitting portion 8*c* that are each formed integrally with the shaft 81 have the shape of a regular hexagon as viewed along the rotation shaft 23*a*. However, this is merely a non-limiting example. It is suitable to form the other end of the shaft 81 to have the shape of a regular polygon as viewed along the rotation shaft 23*a*.

What is claimed is:

1. A hand-held cutter comprising:
a disc-shaped cutting blade which is configured to rotate about a rotation shaft to cut a target;
a cutter body which rotatably supports the cutting blade;
a protection cover which is rotatable about the rotation shaft and covers a portion of the cutting blade; and
a pressing mechanism which is movable in parallel to the rotation shaft, and when positioned close to one side of the hand-held cutter, imposes and maintains restrictions on rotation of the protection cover by pressing the protection cover onto the cutter body or the cutter body onto the protection cover; wherein:

the pressing mechanism includes a biasing member which is configured to exert a biasing force to move the pressing mechanism toward the one side of the hand-held cutter;
the hand-held cutter is configured such that moving the pressing mechanism, against the biasing force of the biasing member, toward a side opposite to the one side of the hand-held cutter removes the restrictions on the rotation of the protection cover;
the pressing mechanism is movable in parallel to the rotation shaft by screwing movements;
the pressing mechanism includes a rod member of which one end is provided with a screwable portion and the other end thereof is fixed to a manipulation handle manipulatable by an operator,
the hand-held cutter further comprises a nut that includes a screw receiving portion which extends in parallel to the rotation shaft, and in which the screwable portion can be screwed toward and away from the cutter body, and
the biasing member has one end fixed to a support plate and the other end thereof fixed to the manipulation handle, and exerts the biasing force in a torsional direction in which the screwable portion is screwed toward the cutter body to cause the rod member to move toward the one side of the hand-held cutter.

2. The hand-held cutter of claim 1, wherein
the biasing member is configured as a torsion coil spring mounted around the rod member.

3. The hand-held cutter of claim 2, wherein
the hand-held cutter further comprises a guide plate attached on an outer surface of a sidewall of the protection cover,
the guide plate has an arch-shaped slit extending around the rotation shaft, and
the rod member passes through the slit, is movable in parallel to the rotation shaft, and is configured to move relative to the slit as the protection cover rotates.

4. The hand-held cutter of claim 1, wherein
the manipulation handle extends in a direction perpendicular to the rotation shaft, is in a shape of a lever, and has one end fixed to the other end of the rod member, and the other end of the manipulation handle configured as a manipulation portion manipulatable by the operator.

5. The hand-held cutter of claim 4, wherein
the cutter body is provided with a grip frame by which the operator can raise the cutter body,
the manipulation handle is located near the grip frame,
the manipulation portion is positioned above the rod member, and
turning the manipulation handle so as to bring the manipulation portion closer to the grip frame causes the rod member is screwed away from the cutter body.

6. The hand-held cutter of claim 1, wherein
the rod member includes a shaft and a mounting plate,
the shaft has one end provided with the screwable portion, and the other end provided with a fitting portion having a shape of a regular polygon as viewed along the rotation shaft,
the mounting plate has a fitting hole which can be externally fitted on the fitting portion, and an engagement projection which projects from an outer periphery of the mounting plate and can engage with the manipulation handle,
a wall defining the fitting hole has a plurality of fitting recesses which each have a triangular shape as viewed in a direction in which the fitting hole penetrates the mounting plate and which are arranged regularly in a circumferential direction, corners of the fitting portion can engage with the plurality of fitting recesses, and the plurality of fitting recesses are arranged asymmetrically with respect to a line connecting a center of the engagement projection and a center of the fitting hole, as viewed in the direction in which the fitting hole penetrates the mounting plate.

* * * * *